United States Patent [19]

Saheki et al.

[11] Patent Number: 5,143,952
[45] Date of Patent: Sep. 1, 1992

[54] PROCESS FOR THE PRODUCTION OF CEMENT-SYNTHETIC POLYMER COMPOSITE MOLDED BODIES

[75] Inventors: Takasi Saheki; Hideaki Matsuda, both of Marugame; Kinya Yokota, Shiga; Tominobu Mayuzumi, Ootsu, all of Japan

[73] Assignees: Okura Industrial Co., Ltd.; Dai-Ichi Kogyo Seiyaku Co., Ltd., both of Japan

[21] Appl. No.: 766,180

[22] Filed: Sep. 27, 1991

[51] Int. Cl.$^5$ .................................................. C08J 5/10
[52] U.S. Cl. ........................................ 524/5; 524/801
[58] Field of Search ................................... 524/5, 801

[56] References Cited

U.S. PATENT DOCUMENTS

| | | | |
|---|---|---|---|
| 4,891,072 | 1/1990 | Cooper | 524/5 |
| 5,008,321 | 4/1991 | Hartmann et al. | 524/378 |

Primary Examiner—Paul R. Michl
Assistant Examiner—La Vonda R. DeWitt
Attorney, Agent, or Firm—Lorusso & Loud

[57] ABSTRACT

A composite, molded article is prepared by forming a W/O emulsion containing a vinyl monomer, water, a cement, a polymerization initiator and an emulsifier, followed by molding and hardening. The emulsifier includes a neutralization product of an amide-containing amine with an organic sulfonic acid or an organic acid phosphate. The amide-containing amine is a condensation product obtained by reacting a fatty acid having 8-24 carbon atoms with an amino compound having the general formula (I) or (II):

$$R^1R^2N\text{-}(CH_2)_x\text{-}NH\text{-}_yH \quad (I)$$

$$R^3N\text{-}[(CH_2)_z\text{-}NH_2]_2 \quad (II)$$

wherein $R^1$, $R^2$, $R^3$ each represent, independently from each other, hydrogen, an alkyl group haaving 1-24 carbon atoms or an alkenyl group having 1-24 carbon atoms, x is an integer of 1-4, y is an integer of 1-8 and z is an integer of 1-4.

3 Claims, No Drawings

PROCESS FOR THE PRODUCTION OF CEMENT-SYNTHETIC POLYMER COMPOSITE MOLDED BODIES

BACKGROUND OF THE INVENTION

This invention relates to a process for the production of a composite, molded article obtained from a cement.

Molded, plastic concrete bodies obtained from cement-containing W/O (water in oil) emulsions are light in weight and high in toughness and, thus, are now increasingly used as construction materials. Such plastic concrete bodies have been generally produced by a method including the steps of forming a W/O emulsion by mixing a vinyl monomer, water, an emulsifier and a polymerization initiator, mixing a cement with the W/O emulsion to form a mixture, molding the mixture, hardening the molded product by both polymerization of the monomer and the hardening of the cement.

As an emulsifier for forming the above W/O emulsion, Japanese Published Examined Patent Application (Tokkyo Kokoku) No. 64-341 proposes the use of an esterification product obtained by reaction of a polyalkylene glycol having an average molecular weight of 2,000-3,000 with a dibasic acid anhydride. With such an emulsifier, however, the emulsion has so low a viscosity that it is impossible to form a plate by extrusion thereof. Further, since a relatively large amount of a vinyl monomer is needed to form the emulsion, the final molded product fails to show satisfactory flame resistance.

To cope with these problems, Japanese Tokkyo Kokoku No. 1-30778 suggests the use of an ester-containing nonionic surfactant having an HLB value of 3-5, such as sorbitan monooleate as an emulsifier. While the use of the surfactant permits the molding of the emulsion by extrusion and the reduction of the amount of the vinyl monomer, there is caused a problem because the ester is susceptible to hydrolysis so that the emulsion is not stable. Additionally, since the emulsifier is not completely soluble in the monomer, undissolved matters tend to accumulate or deposit on the bottom of a mixer, a storage tank or pipes connected thereto. This necessitates periodical cleaning of the apparatus.

SUMMARY OF THE INVENTION

It is, therefore, an object of the present invention to provide a process which is devoid of the above-described problems.

It is a special object of the present invention to provide an emulsifier perfectly soluble in a vinyl monomer and useful for forming a stable, cement-containing W/O emulsion which can produce molded bodies with various desired shapes.

In accomplishing the foregoing objects, there is provided in accordance with the present invention a process for the production of a composite, molded article, wherein a water in oil emulsion containing a vinyl monomer, water, a cement, a polymerization initiator and an emulsifier is molded and the resulting molded body is hardened by polymerizing the vinyl monomer while hardening the cement, characterized in that the emulsifier includes a neutralization product of an amide-containing amine with a neutralizing agent selected from the group consisting of organic sulfonic acids and organic acid phosphates, the amide-containing amine being a condensation product obtained by reacting a fatty acid having 8-24 carbon atoms with an amino compound selected from the group consisting of those having the following general formulas (I) and (II):

wherein $R^1$, $R^2$, $R^3$ each represent, independently from each other, hydrogen, an alkyl group having 1-24 carbon atoms or an alkenyl group having 1-24 carbon atoms, x is an integer of 1-4, y is an integer of 1-8 and z is an integer of 1-4.

Other objects, features and advantages of the present invention will become apparent from the detailed description of the invention to follow.

DETAILED DESCRIPTION OF THE PREFERRED EMBODIMENTS OF THE INVENTION

The process according to the present invention is characterized by the use of a specific emulsifier for forming a cement-containing W/O emulsion. The emulsifier may be obtained by the following method.

First, a fatty acid having 8-24 carbon atoms is reacted with an amino compound of the following general formula (I) or (II) to obtain an amide-containing amine:

wherein $R^1$, $R^2$, $R^3$ each represent, independently from each other, hydrogen, an alkyl group having 1-24 carbon atoms or an alkenyl group having 1-24 carbon atoms, x is an integer of 1-4, is an integer of 1-8 and z is an integer of 1-4.

As the fatty acid, there may be used a saturated fatty acid such as caprylic acid, capric acid, lauric acid, myristic acid, palmitic acid, stearic acid or behenic acid; an unsaturated fatty acid such as a linderic acid (4-dodecenoic acid), myristoleic acid, oleic acid, elaidic acid, linoleic acid or linolenic acid; a fatty acid containing a hydroxyl group or a carbonyl group such as sabinic acid, ricinoleic acid, licanic acid, a castor oil-derived fatty acid or 2-hydroxyoctadecanoic acid; or a mixture of two or more of the above acids. Both synthetic and natural fatty acids may be used for the purpose of the present invention. A mixed fatty acid product obtained from a naturally occurring fat and oil, such as coconut fatty acids, beef tallow fatty acids and palm oil fatty acids, may be suitably used.

The amino compound to be reacted with the above fatty acid is a diamine or a polyamine expressed by the above formula (I) or (II). Illustrative of suitable amines of the formula (I) are ethylenediamine, triethylenetetramine, tetraethylenepentamine, pentaethylenehexamine, propylenediamine, butylenediamine, dimethylaminoethylamine, ethylaminoethylamine, diethylaminoethylamine, diethylaminopropylamine, laurylaminopropylamine, stearylaminopropylamine, oleylaminopropylamine and beef tallow-aminopropylamine. Illustrative of suitable amines of the formula (II) are iminobispropylamine, methyliminobispropylamine, iminobisbutylamine, lauryliminobispropylamine, palmityliminobispropylamine and oleyliminobispropylamine.

The condensation reaction of the fatty acid and the amino compound may be performed in any known manner. If necessary, a catalyst may be used. Generally, the above reaction may be performed by reacting the two compounds at a temperature of 160°-220° C. with stirring in the atmosphere of nitrogen while distilling the water formed in situ as a result of the condensation. The fatty acid and the amino compound are used in amounts so that the resulting condensation product have an average amide linkage number of 0.5-2.4, preferably 0.7-2.1. The course of the condensation reaction may be monitored by measuring the acid value of the product.

The amide-containing amine thus obtained is then neutralized with a neutralizing agent which is an organic sulfonic acid or an organic acid phosphate. Examples of the organic sulfonic acids include alkylsulfonic acids, α-olefinsulfonic acids, allylsulfonic acid, arylsulfonic acids, alkylarylsulfonic acids, naphthalenesulfonic acids, alkylnaphthalenesulfonic acids, phenolsulfonic acids, naphtholsulfonic acids, ligninsulfonic acids and petroleum sulfonic acids.

Examples of the organic acid phosphates include alkyl phosphates and phosphoric acid esters of polyalkylene glycoltype nonionic surfactants. As the alkyl phosphates, there may be mentioned monoesters, diesters or mixtures thereof obtained by esterifying aliphatic mono or polyhydric alcohols having 4-22 carbon atoms with a suitable phosphorylating agent. As the esters of the nonionic surfactants, there may be mentioned monoesters, diesters, triesters and mixtures thereof obtained by esterifying polyalkylene glycol nonionic surfactant with a suitable phosphorylating agent. The polyalkylene glycol nonionic surfactants may be, for example, addition products obtained by reacting alcohols with 2-34 carbon atoms, such as saturated or unsaturated higher alcohols, phenol, alkylphenols or fatty acids with an alkylene oxide in an addition mole number of 1-50 moles. Examples of the alkyleneoxides include ethylene oxide, propylene oxide, butylene oxide and styrene oxide. If desired, these alkylene oxides may be used in combination of two or more. When two or more alkylene oxides are used in combination, the addition reaction may be in random polymerization or block polymerization mode.

The neutralization is performed so as to neutralize at least a portion of the amino groups remaining in the amide-containing amine (condensation product) with the sulfonic acid or phosphate neutralizing agent. If desired, the neutralizing agent may be used in excess of the stoichiometric amount. Generally, the neutralizing agent is used in an amount so that the weight ratio of the amide-containing amine to the neutralizing agent is 95:5 to 30:70, preferably 80:20 to 40:60.

The neutralized product as such may be used as the emulsifier. The emulsifier may contain a higher fatty acid having 8-24 carbon atoms. The higher fatty acid can control the viscosity of the W/O emulsion without adversely affecting the stability thereof and emulsifying effect of the emulsifier so that extrusion of the emulsion can be smoothly performed. This fatty acid may be selected from those exemplified previously as the starting material for the reaction with the amino compound of the formula (I) or (II). The amount of the fatty acid in the emulsifier may be 60% or less, preferably 50% or less, based on the total weight of the amide-containing amine, the neutralizing agent and the fatty acid. The fatty acid may be added either before or after the above neutralization step.

The higher fatty acid contained in the emulsifier may be one which remains unreacted in the amide-forming condensation stage. Namely, the amino compound of the formula (I) or (II) is reacted with an excess amount of the fatty acid and the resulting reaction mixture is neutralized with the neutralizing agent to obtain an emulsifier containing unreacted fatty acid.

The emulsifier may also contain a surfactant or a conventional emulsifying agent such as a sucrose fatty acid ester, a sorbitan fatty acid ester, a glycerin or polyglycerin fatty acid ester, a polyethylene glycol fatty acid ester, polyoxyethylene alkyl ether, polyoxyethylene alkylphenyl ether, an ethylene oxide adduct of a fatty acid alkanol amide, a polyoxyethylene polyoxypropylene block copolymer, an ethylenediamine-polyoxypropylene-polyoxyethylene block copolymer, a polyoxypropylene-polyoxyethylene-polyamine (e.g. polyethylenepolyamine or polyethyleneimine) block copolymer, an ethylene oxide adduct of a polyamine or an propylene oxide adduct of a polyamine.

The foregoing emulsifier is used for the formation of a W/O emulsion containing a water-insoluble, liquid, polymerizable vinyl monomer, water, a cement and a polymerization initiator. Any vinyl monomer, cement and initiator conventionally used in the field of the production of plastic concrete materials may be suitably used for the purpose of the present invention.

Examples of suitable vinyl monomers include styrene, α-methylstyrene, an acrylic acid ester, acrylonitrile, divinylbenzene, an alkylene glycol diacrylate, an alkylene glycol dimethacrylate, an alkylene glycol methacrylate, an acrylate or methacrylate of a polyhydric alcohol, and mixtures thereof. For reasons of improved physical properties of the final cement molded products, it is preferred that a divinyl or trivinyl compound, such as ethylene glycol dimethacrylate or trimethylolpropane trimethacrylate, be used in conjunction with a monovinyl monomer.

As the cement, there may be used, for example, a portland cement, a blastfurnace cement, a fly ash cement, a magnesia cement, an alumina cement or a mixture thereof.

As the polymerization initiator, there may be generally used a radical initiator or a redox catalyst.

If desired, the W/O emulsion may further contain conventionally employed additives such as reinforcing fibers, light weight aggregates, fillers and pigments.

The W/O emulsion may be suitably obtained by first mixing the vinyl monomer with the emulsifier and the initiator, the resulting mixture or solution being, thereafter, mixed with water to form an emulsion. The cement and, if any, the additives are then mixed with the emulsion. Alternately, these components may be added together with water.

The amount of emulsifier is generally 1-50 parts by weight, preferably 3-20 parts by weight, per 100 parts by weight of the vinyl monomer. Too large an amount of the emulsifier in excess of 50 parts by weight adversely affects the polymerization of the monomer so that the strength of the final molded body is lowered. When the amount of the emulsifier is smaller than 1 part by weight, the W/O emulsion is unstable. The amounts of the water and the cement in the W/O emulsion are desirably 2-30 parts by weight and 5-40 parts, respectively, per 1 part by weight of the vinyl monomer mixture consisting of the vinyl monomer, emulsifier and polymerization initiator.

The cement-containing W/O emulsion is then molded into a plate, a block or any other desired shape. The molding may be suitably effected by extrusion. The molded body is then allowed to stand at room temperature or an elevated temperature so that the vinyl monomer is polymerized and the cement is hardened, thereby to obtain a hardened molded body. To facilitate the hardening, the molded body is preferably kept in a saturated water vapor condition.

Since the emulsifier used in the present invention is completely soluble in the vinyl monomer, no fouling of the apparatus occurs. Further, since the W/O emulsion obtained by the use of the emulsifier is stable and has suitable viscosity, extrusion may be advantageously adopted for the molding of the emulsion.

The following examples will further illustrate the present invention. "Parts" are by weight.

EXAMPLE 1

Preparation of Emulsifier

Emulsifier (1): Triethylenetetramine (1 mole) was reacted with 1.2 moles of lauric acid to obtain an amide-containing amine. This amide-containing amine (7 parts) was neutralized with 3 parts of dodecylbenzenesulfonic acid to obtain Emulsifier (1).

Emulsifier (2): Pentaethylenehexamine (1 mole) was reacted with 1.5 moles of oleic acid to obtain an amide-containing amine. This amide-containing amine (6 parts) was neutralized with 4 parts of dodecylbenzenesulfonic acid to obtain Emulsifier (2).

Emulsifier (3): Laurylaminopropylamine (1 mole) was reacted with 0.8 mole of oleic acid to obtain an amide-containing amine. This amide-containing amine (6 parts) was neutralized with 2.5 parts of dodecylbenzenesulfonic acid, to which were added 1.5 parts of oleic acid to obtain Emulsifier (3).

Emulsifier (4): Tetraethylenepentamine (1 mole) was reacted with 1 mole of lauric acid to obtain an amide-containing amine. This amide-containing amine (9 parts) was neutralized with 1 part of α-olefin($C_8$-$C_{30}$)sulfonic acid to obtain Emulsifier (4).

Emulsifier (5): Iminobispropylamine (1 mole) was reacted with 1.8 moles of capric acid to obtain an amide-containing amine. This amide-containing amine (7 parts) was neutralized with 3 parts of α-olefin($C_8$-$C_{30}$)sulfonic acid to obtain Emulsifier (5).

Emulsifier (6): Lauryliminobispropylamine (1 mole) was reacted with 0.8 mole of oleic acid to obtain an amide-containing amine. This amide-containing amine (4.5 parts) was neutralized with 4.5 parts of a 1:1 (by weight) mixture of (a) petroleum sulfonic acid and (b) a equimolar mixture of mono-2-ethylhexylphosphate and di-2-ethylhexylphosphate, to which was added 1 part of ricinoleic acid to obtain Emulsifier (6).

Emulsifier (7): Tetraethylenepentamine (1 mole) was reacted with 1.3 moles of coconut oil fatty acid to obtain an amide-containing amine. This amide-containing amine (6 parts) was neutralized with 3 parts of a equimolar mixture of mono-2-ethylhexylphosphate and di-2-ethylhexylphosphate, to which was added 1 part of coconut oil fatty acid to obtain Emulsifier (7).

Emulsifier (8): Pentaethylenehexamine (1 mole) was reacted with 0.7 mole of oleic acid to obtain an amide-containing amine. This amide-containing amine (7 parts) was neutralized with 3 parts of phosphoric acid esters of polyoxyethylene(P=5)nonylphenyl ether (equimolar mixture of mono- and diesters) to obtain Emulsifier (8). "P" represents the addition mole number of the alkyleneoxide.

Emulsifier (9): Pentaethylenehexamine (1 mole) was reacted with 1.9 moles of oleic acid to obtain an amide-containing amine. This amide-containing amine (8 parts) was neutralized with 2 parts of phosphoric acid esters of polyoxyethylene(P=8)oleyl ether (equimolar mixture of mono- and diesters) to obtain Emulsifier (9).

Emulsifier (10): Iminobispropylamine (1 mole) was reacted with 0.9 mole of oleic acid to obtain an amide-containing amine. This amide-containing amine (7 parts) was neutralized with 3 parts of phosphoric acid esters of polyoxyethylene(P=2)nonylphenyl ether (equimolar mixture of mono- and diesters) to obtain Emulsifier (10).

Emulsifier (11): Iminobispropylamine (1 mole) was reacted with 0.7 mole of capric acid to obtain an amide-containing amine. This amide-containing amine (4 parts) was neutralized with 4 parts of a equimolar mixture of mono-2-ethylhexylphosphate and di-2-ethylhexylphosphate, to which was added 2 parts of oleic acid to obtain Emulsifier (11).

Emulsifier (12): Oleyliminobispropylamine (1 mole) was reacted with 0.8 mole of oleic acid to obtain an amide-containing amine. This amide-containing amine (4.5 parts) was neutralized with 5.5 parts of phosphoric acid esters of polyoxyethylene(P=15)lauryl ether (equimolar mixture of mono-and diesters) to obtain Emulsifier (12).

Emulsifier (13): Tetramethylenepentamine (1 mole) was reacted with 1.5 moles of oleic acid to obtain an amide-containing amine. This amide-containing amine (4.8 parts) was neutralized with 3.2 parts of dodecylbenzenesulfonic acid, to which were added 2 parts of oleic acid to obtain Emulsifier (13).

Emulsifier (14): Tetramethylenepentamine (1 mole) was reacted with 1.5 moles of oleic acid to obtain an amide-containing amine. This amide-containing amine (4.2 parts) was neutralized with 2.8 parts of dodecylbenzenesulfonic acid, to which were added 3 parts of oleic acid to obtain Emulsifier (14).

Emulsifier (15): Tetramethylenepentamine (1 mole) was reacted with 1.5 moles of oleic acid to obtain an amide-containing amine. This amide-containing amine (3.6 parts) was neutralized with 2.4 parts of dodecylbenzenesulfonic acid, to which were added 4 parts of oleic acid to obtain Emulsifier (15). Emulsifier (16): Tetramethylenepentamine (1 mole) was reacted with 1.5 moles of oleic acid to obtain an amide-containing amine. This amide-containing amine (5.6 parts) was neutralized with 1.4 parts of dodecylbenzenesulfonic acid, to which were added 3 parts of oleic acid to obtain Emulsifier (16).

EXAMPLE 2

87 Parts of styrene, 1 part of benzoylperoxide and 12 parts of Emulsifier (1) obtained in Example 1 were mixed to form a clear vinyl monomer solution. To a kneader were fed 100 parts/hour of the vinyl monomer solution, 3100 parts/hour of a portland cement, 1300 parts/hour of water and 45 parts/hour of acrylic fiber having a length of 5 mm to continuously produce a cement-containing W/O emulsion. This emulsion was then extruded into plates. The plates are allowed to stand at 60° C. for 4 hours to polymerize the styrene and then at room temperature for 2 weeks to harden the cement. The hardened plates were dried to obtain composite plates.

EXAMPLE 3

74 Parts of styrene, 5 parts of trimethylolpropane trimethacrylate, 1 part of azobisisobutylonitrile and 12 parts of Emulsifier (3) obtained in Example 1 were mixed to form a clear vinyl monomer solution. To a kneader were fed 100 parts/hour of the vinyl monomer solution, 1000 parts/hour of a portland cement, 2000 parts/hour of water and 31 parts/hour of Vinylon fiber having a length of 6 mm to continuously produce a cement-containing W/O emulsion. This emulsion was then extruded into plates. The plates are allowed to stand at 90° C. for 24 hours to polymerize the monomers and to harden the cement. The hardened plates were dried to obtain composite plates.

EXAMPLE 4

76 Parts of methyl methacrylate, 5 parts of ethylene glycol dimethacrylate, 1 part of cumene hydroperoxide and 20 parts of Emulsifier (8) obtained in Example 1 were mixed to form a clear vinyl monomer solution. To a kneader were fed 100 parts/hour of the vinyl monomer solution, 2300 parts/hour of a portland cement, 1300 parts/hour of water and 37 parts/hour of polypropylene fiber having a length of 6 mm to continuously produce a cement-containing W/O emulsion. The emulsion was then extruded into plates. The plates are allowed to stand at 40° C. for 4 weeks to polymerize the monomers and to harden the cement. The hardened plates were dried to obtain composite plates.

EXAMPLE 5

88 Parts of styrene, 1 part of t-butylperoxybenzoate and 8 parts of Emulsifier (14) obtained in Example 1 were mixed to form a clear vinyl monomer solution. To a kneader were fed 100 parts/hour of the vinyl monomer solution, 3300 parts/hour of a portland cement, 1200 parts/hour of water and 37 parts/hour of acrylic fiber having a length of 5 mm to continuously produce a cement-containing W/O emulsion. This emulsion was then extruded into plates. The plates were allowed to stand at 40° C. for 4 weeks to polymerize the styrene and to harden the cement. obtain composite plates. The hardened plates were dried to obtain composite plates.

EXAMPLE 6

Using the emulsifiers obtained in Example 1 and other than those used in Examples 2-5, composite molded plates were prepared. Emulsifiers (1)–(16) gave W/O emulsions having good stability and moldability.

COMPARATIVE EXAMPLE

88 Parts of styrene, 1 part of t-butylperoxybenzoate and 8 parts of sorbitan monooleate were mixed to obtain a vinyl monomer mixture. This mixture contained white insoluble precipitats. To a kneader were fed 100 parts/hour of the vinyl monomer mixture, 3300 parts/hour of a portland cement, 1200 parts/hour of water and 37 parts/hour of acrylic fiber having a length of 5 mm to continuously produce a cement-containing W/O emulsion. This emulsion was then extruded into plates. The moldability was not good because of separation of the water from the emulsion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the production of a composite, molded article, wherein a water in oil emulsion containing a vinyl monomer, water, a cement, a polymerization initiator and an emulsifier is molded and the resulting molded body is hardened by polymerizing said vinyl monomer while hardening said cement, characterized in that said emulsifier includes a neutralization product of an amide-containing amine with a neutralizing agent selected from the group consisting of organic sulfonic acids and organic acid phosphates, said amide-containing amine being a condensation product obtained by reacting a fatty acid having 8–24 carbon atoms with an amino compound selected from the group consisting of those having the following general formulas (I) and (II):

$$R^1R^2N\text{-}[(CH_2)_x\text{-}NH]_y\text{-}H \quad (I)$$

$$R^3N\text{-}[(CH_2)_z\text{-}NH_2]_2 \quad (II)$$

wherein $R^1$, $R^2$, $R^3$ each represent, independently from each other, hydrogen, an alkyl group having 1–24 carbon atoms or an alkenyl group having 1–24 carbon atoms, x is an integer of 1–4, y is an integer of 1–8 and z is an integer of 1–4.

2. A process according to claim 1, wherein said emulsifier additionally contains a higher fatty acid having 8–24 carbon atoms.

3. A composite, molded body obtained by the process according to claim 1.

* * * * *

UNITED STATES PATENT AND TRADEMARK OFFICE
CERTIFICATE OF CORRECTION

PATENT NO.   : 5,143,952
DATED        : September 1, 1992
INVENTOR(S)  : Saheki, et. al.

It is certified that error appears in the above-indentified patent and that said Letters Patent is hereby corrected as shown below:

Column 2, line 35, after "1-4," insert --y--.

Column 3, line 64, delete "after-" insert --after--.

Column 6, line 42, begin a new paragraph with "Emulsifier".

Column 7, line 37, delete "obtain composite plates".

Signed and Sealed this

Twenty-second Day of February, 1994

Attest:

BRUCE LEHMAN

*Attesting Officer*     *Commissioner of Patents and Trademarks*